United States Patent
H. M. et al.

(10) Patent No.: US 10,169,983 B2
(45) Date of Patent: Jan. 1, 2019

(54) METHOD OF NOISE SUPPRESSION FOR VOICE BASED INTERACTIVE DEVICES

(71) Applicant: Honeywell International Inc., Morristown, NJ (US)

(72) Inventors: Shankar Prasad H. M., Bangalore (IN); Harini Bharadvaj, Bangalore (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 82 days.

(21) Appl. No.: 14/278,558

(22) Filed: May 15, 2014

(65) Prior Publication Data

US 2015/0332585 A1    Nov. 19, 2015

(51) Int. Cl.
| | |
|---|---|
| G08B 29/18 | (2006.01) |
| G10L 21/0208 | (2013.01) |
| G06F 3/16 | (2006.01) |
| G08B 29/12 | (2006.01) |
| G08B 25/01 | (2006.01) |

(52) U.S. Cl.
CPC ........... G08B 29/185 (2013.01); G06F 3/167 (2013.01); G08B 25/014 (2013.01); G08B 29/126 (2013.01); G10L 21/0208 (2013.01)

(58) Field of Classification Search
CPC .................................. H03G 3/00; G08B 21/00
See application file for complete search history.

(56) References Cited

U.S. PATENT DOCUMENTS

| | | | |
|---|---|---|---|
| 5,987,106 A | 11/1999 | Kitamura | |
| 7,020,292 B1 | 3/2006 | Heubel et al. | |
| 2002/0057197 A1 | 5/2002 | Mathney | |
| 2004/0036596 A1* | 2/2004 | Heffner | G08B 13/19695 340/531 |
| 2004/0203353 A1* | 10/2004 | Connor | H04M 1/72533 455/41.1 |
| 2006/0140391 A1 | 6/2006 | Bizjak et al. | |

(Continued)

FOREIGN PATENT DOCUMENTS

EP    2 282 503 A2    2/2011

OTHER PUBLICATIONS

Partial European search report from corresponding EP patent application 15165295.5 dated Nov. 22, 2016.

(Continued)

*Primary Examiner* — Shreyans A Patel
(74) *Attorney, Agent, or Firm* — Husch Blackwell LLP

(57) ABSTRACT

An apparatus including a security system protecting a secured area, a processor of the security system providing a voice connection between a control panel of the security system located within the secured area and a remotely located central monitoring station, the processor automatically providing notification of activation of the provided voice connection, an audio device providing audio entertainment within the secured area, a wireless interface providing a communication channel between the security system and audio entertainment system and a processor of the audio device receiving the automatic notification of activation of the voice connection from the processor of the security system through the wireless interface and automatically reducing a volume of the audio entertainment provided by the audio device within the secured area.

15 Claims, 1 Drawing Sheet

(56) References Cited

U.S. PATENT DOCUMENTS

| | | | |
|---|---|---|---|
| 2007/0189544 A1* | 8/2007 | Rosenberg | H03G 3/32 |
| | | | 381/57 |
| 2008/0242328 A1 | 10/2008 | Kummer et al. | |
| 2008/0309449 A1 | 12/2008 | Martin et al. | |
| 2009/0082071 A1 | 3/2009 | Hicks, III | |
| 2009/0323904 A1 | 12/2009 | Shapiro et al. | |
| 2012/0139718 A1 | 6/2012 | Foisy et al. | |
| 2012/0250834 A1 | 10/2012 | Smith et al. | |
| 2012/0296486 A1* | 11/2012 | Marriam | G05B 15/02 |
| | | | 700/296 |
| 2014/0156281 A1* | 6/2014 | Boyd | H04L 12/281 |
| | | | 704/275 |
| 2015/0312050 A1* | 10/2015 | Warren | G08B 13/00 |
| | | | 348/14.04 |

OTHER PUBLICATIONS

Office Action for corresponding Canadian patent application 2,890,502, dated Jul. 27, 2016.

Extended European search report for corresponding EP patent application 15165295.5, dated Sep. 1, 2017.

* cited by examiner

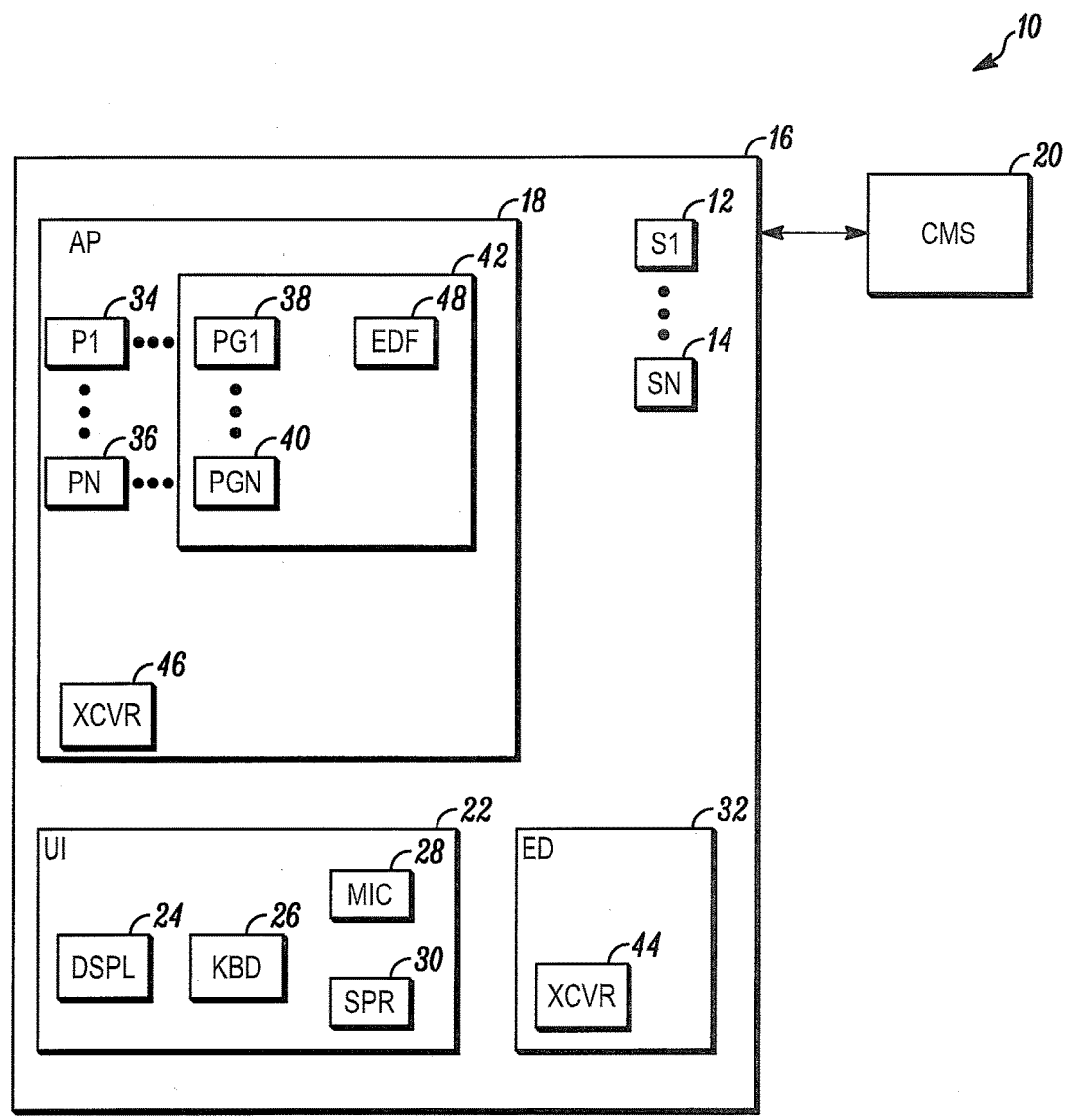

US 10,169,983 B2

METHOD OF NOISE SUPPRESSION FOR VOICE BASED INTERACTIVE DEVICES

FIELD

This field relates to security systems and more particularly to methods of avoiding false alarms.

BACKGROUND

Systems are known to detect threats within secured areas. Such systems typically include the use of at least one sensor that detects threats within the secured area. A local audible alarm may also be provided to notify authorized occupants of threats detected within the secured area.

Threats detected by such systems may include any of a number of events that threaten the health and/or safety of human occupants or assets. An example of a threat to human occupants may include toxic gas. Other threats to the safety of occupants and/or assets may include fire, explosion or unauthorized intruders.

In general, a security system may include a control panel that monitors each of the sensors within the secured area. Where the security system is used within a home, the control panel may include a number of operational states including armed away, disarmed, armed stay, etc. A display and a user interface may be located within the secured area and be used by an occupant of the secured area to individually select each of the operational states.

In the armed away state, a processor of the control panel may monitor each of the sensors for activation. Upon activation of any sensor, the processor may send an alarm message to a central monitoring station.

Similarly, in the disarmed state, the processor may only monitor fire and/or toxic gas sensors. In the armed stay state, the processor may only monitor fire sensors, gas sensors and intrusion sensors along a periphery of the secured area. Upon activation of any of the monitored sensors, the processor may sound a local alarm and notify the central monitoring station.

While such systems work well, they are subject to false alarms. Accordingly, a need exists for better methods of identifying false alarms.

BRIEF DESCRIPTION OF THE DRAWINGS

FIG. 1 illustrates a block diagram of a security system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a simplified block diagram of a security system 10 shown generally in accordance with an illustrated embodiment. Included within the security system is a number of sensors 12, 14 that detect threats within a secured area 16.

The sensors may be based upon any of a number of different sensing technologies. For example, the sensors may include one or more limit switches located on the doors or windows along a periphery of the secured area. The limit switches may be used to detect entry of intruders or other unauthorized persons into the secured area.

The sensors may also be embodied as environmental sensors. In this regard, the sensors may detect fire, smoke or toxic gases.

The sensors may also be embodied as a number of non-contact sensors (e.g., passive infrared (PIR) detectors, etc.). Alternatively, the sensors may include one or more or closed circuit television (CCTV) cameras that detect movement within a field of view of the camera.

The sensors within the secured area may be monitored by an alarm panel 18 located within the secured area (as shown in FIG. 1) or located remotely of the secured area. Upon activation of any of the sensors, the alarm panel may compose and send an alarm message to a central monitoring station 20.

A user interface 22 may be provided within the secured area for control of the security system. The interface may include a display 24 that shows status message to authorized users and a keyboard 26. Alternatively, the display and keyboard may be combined into a touch screen display.

The user interface may also include a microphone 28 and a speaker 30. The user interface may also include a camera. The microphone and speaker may be used for audio conversations between an authorized user of the secured area and a person (e.g., a guard) within the central monitoring station.

Also included within the secured area may be one or more entertainment devices 32. The entertainment devices could be, for example, a Smart TV, Smart Home theater systems, etc. The entertainment device may be a television set, a home entertainment center or any of a number of other devices that emit audio energy (signals).

Included within the alarm panel and the one or more entertainment devices may be a number of processor apparatus (processors) 34, 36, each operating under control of one or more computer programs 38, 40 loaded from a non-transitory computer readable medium (memory) 42. As used herein, reference to a step performed by a computer program is also reference to the processor that executed that step.

To use the security system, an authorized person (user) may enter a personal identifier (PID) through the keyboard followed by entry of a command (i.e., activation of a function key (e.g., armed away, armed stay, disarm, etc.)). A status processor within the alarm panel may detect the entry of the command and cause the security system to assume the appropriate state.

In an armed state, an alarm processor may monitor all of the sensors within the secured area. Upon activation of a sensor, the alarm processor may compose and send an alarm message to the central monitoring station.

The alarm message may include an identifier of the security system (e.g., an account number, address, etc.), an identifier of the sensor that was activated and a time of activation. Upon receipt of the alarm message, a person at the central monitoring station may review the alarm message to determine the type of alarm (e.g., fire, intrusion, gas, etc.) based upon the identifier of the sensor. Based upon the type of alarm involved, the person may dispatch the police (in the case of an intruder) or the fire department (in the case of a fire). The person at the central station may also take steps to confirm that the alarm is, in fact, one that requires outside assistance and is not a false alarm.

For example, in the case of an intrusion alarm, the person may initiate a voice connection between a computer console of the person at the central station and the user interface within the secured area. To form a voice connection, the person at the central station may activate a call button on his/her console. In response, a communication processor within the person's console may send a voice call set-up message to a corresponding voice call set-up processor within the alarm panel. The set-up processor within the alarm panel may set up a voice connection (e.g., a switched circuit connection, a VoIP connection, etc.) between the speaker and microphone of the user interface and a corresponding speaker and microphone of the console within the central monitoring station.

Upon completion of set of the voice connection, the person at the central station may converse with a person located at the user interface of the security system within the secured area. Based upon that conversation, the person at the central monitoring station may confirm that the alarm is a false alarm or is more serious. If more serious (or if no one answers the call at the user interface), then the person may dispatch help.

Under the illustrated embodiment, the security system operates to automatically reduce the volume of any entertainment devices within the secured area. This may be done to reduce the possibility that any authorized persons within the secured area do not hear the call from the central monitoring station inquiring about the possibility of a false alarm.

To this end, each of the entertainment devices located within the secured area includes a transceiver (or simply a receiver) 44 and program executing on a processor that constantly monitors for signals from a corresponding transceiver (or simply a transmitter) 46 controlled by the alarm panel. In this regard, the transceivers may operate to automatically set up a communication channel under an IEEE 802.11 format and exchange messages under a TCP/IP format.

In this regard, each time an entertainment device is activated, a communication processor within the entertainment device registers its presence with the alarm panel by sending a registration message to the alarm panel through the transceiver. The registration message includes a unique system identifier and may include a set of volume control parameters or capabilities. The volume control parameters or capabilities may be sent to the alarm panel from a volume control processor within the entertainment device and may include the format of a message that may be sent to the entertainment device to mute audio emanating from the device or to substantially reduce the volume from the device. A correspond volume control processor within the alarm panel may receive these parameters or capabilities and save a set of values for each entertainment device within a corresponding file 48 along with the identifier of the device.

Under one illustrated embodiment, the user may interact with the entertainment device through the alarm panel. Under this embodiment, an entertainment device processor within the alarm panel may present a user interface on a portable wireless device carried by the user. The user may interact with the entertainment device through the user interface to increase or decrease a volume of the entertainment device through the portable device and the alarm panel.

In another embodiment, the alarm panel may be configured with a voice recognition processor that accepts voice commands from the user. Under this scenario, audio from any nearby entertainment device may interfere with recognized commands from the user. In this case, the voice recognition processor may constantly process audio information received through the microphone associated with the alarm panel in order to detect audio from the user. The voice recognition processor may recognize sounds from the user based upon amplitude or by comparing audio with a voice signature of the user previously stored in memory. Upon detecting audio from the user, the voice recognition processor may activate the volume control processor within the alarm panel. The volume control processor within the alarm panel may send a volume control message to each active entertainment device within the secured area that mutes or reduces the volume of the entertainment device.

Under normal conditions and in the absence of voice commands from the user, the respective volume control processors within the alarm panel and within the entertainment device operate in a standby mode. However, in the case where the alarm panel detects activation of a sensor and sends an alarm message to the central monitoring station, the volume control processors may enter an active state.

For example, if the person at the central monitoring station should decide to initiate a voice connection with the user interface within the secured area in response to a received alarm, then the volume of any entertainment device that are active at the time of the alarm would need to be reduced.

In this regard, the receipt of a voice channel set-up message from the central monitoring station also activates the volume control processor within the alarm panel. Upon receipt of the set-up message, the volume control processor of the alarm panel immediately sends a volume control message to each active entertainment device within the secured area that either mutes the volume or reduces the volume to some low level (e.g., 5% of full volume). This allows the person at the central station to converse with authorized occupants of the secured area without the difficulty of background sound that may make conversation difficult. At the end of the conversation, either the person at the central monitoring station or occupant of the secured area activates a button that terminates the call. The termination of the call is detected by the volume control processor within the alarm panel. Upon the detection of the termination of the call, the volume control processor within the alarm panel sends a second message to the entertainment device canceling the volume reduction and returning the entertainment device to its normal state of operation.

In general, the system includes a security system protecting a secured area, a processor of the security system providing a voice connection between a control panel of the security system located within the secured area and a remotely located central monitoring station, the processor automatically providing notification of activation of the provided voice connection, an audio device providing audio entertainment within the secured area, a wireless interface providing a communication channel (e.g., WiFi) between the security system and audio entertainment system and a processor of the audio device receiving the automatic notification of activation of the voice connection from the processor of the security system through the wireless interface and automatically reducing a volume of the audio entertainment provided by the audio device within the secured area.

In another embodiment, the system includes a security system that protects a secured area, a processor of the security system that receives a set-up instruction and automatically provides a voice connection between a user interface of the security system located within the secured area and a remotely located central monitoring station, a processor of the security system that detects the set-up instruction and that automatically transmits a volume reduction message, an audio device that provides audio entertainment within the secured area, a wireless interface between the security system and audio entertainment system and a processor of the audio device that receives the volume reduction messages automatic transmitted by the processor of the security system through the wireless interface and automatically reduces a volume of the audio entertainment provided by the audio device within the secured area.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method comprising:
    a security system protecting a secured area;
    a volume control processor of the security system operating in a standby mode;
    an audio device providing audio entertainment within the secured area, wherein the audio device provides the audio entertainment at a volume having a first level;
    a wireless interface providing a communication channel between the security system and the audio device, wherein the audio device transmits a registration message to the security system through the wireless interface when the audio device is activated;
    a second processor of the security system detecting a security threat within the secured area or detecting a voice command from a second person proximate a control panel of the security system located within the secured area;
    the volume control processor entering an active state in response to the second processor detecting the security threat or the voice command;
    the second processor providing a voice connection between the control panel and a remotely located central monitoring station in response to the second processor detecting the security threat, thereby facilitating a first person located at the remotely located central monitoring station conversing with the second person;
    when in the active state, the volume control processor automatically transmitting a first automatic notification of activation of the voice connection to the audio device that transmitted the registration message in response to the second processor providing the voice connection;
    when in the active state, the volume control processor automatically transmitting a second automatic notification to the audio device that transmitted the registration message in response to the second processor detecting the voice command;
    a third processor of the audio device receiving the first automatic notification or the second automatic notification from the volume control processor through the wireless interface and automatically reducing the volume of the audio entertainment from the first level to a second level in response to receiving the first automatic notification or the second automatic notification;
    the volume control processor automatically transmitting a call termination message to the audio device in response to the voice connection terminating; and
    the third processor receiving the call termination message from the volume control processor through the wireless interface and automatically returning the volume of the audio entertainment to the first level in response to receiving the call termination message.

2. The method as in claim 1 wherein the wireless interface comprises WiFi.

3. The method as in claim 1 wherein automatically reducing the volume further comprises a software application running on the third processor muting the audio entertainment.

4. The method as in claim 1 wherein the security threat is a fire.

5. The method as in claim 1 wherein the security threat is an intruder.

6. The method as in claim 1 further comprising the second processor monitoring a sensor located within the secured area for the security threat.

7. An apparatus comprising:
    a security system that protects a secured area;
    an audio device that provides audio entertainment within the secured area and transmits a registration message to the security system when the audio device is activated, wherein the audio device provides the audio entertainment at a volume having a first level;
    a wireless interface between the security system and the audio device;
    a first processor of the security system that detects a security threat within the secured area or detects a voice command from a second person proximate a user interface of the security system located within the secured area and that provides a voice connection between the user interface and a remotely located central monitoring station in response to detecting the security threat, thereby facilitating a first person;
    a volume control processor of the security system that operates in a standby mode and enters an active state in response to the first processor detecting the security threat or the voice command, wherein, when in the active state, the volume control processor automatically transmits a first automatic notification of activation of the voice connection to the audio device that transmitted the registration message in response to the first processor providing the voice connection, wherein, when in the active state, the volume control processor automatically transmits a second automatic notification to the audio device that transmitted the registration message in response to the first processor detecting the voice command, and wherein the volume control processor automatically transmits a call termination message to the audio device in response to the voice connection terminating; and
    a second processor of the audio device that receives the first automatic notification or the second automatic notification from the volume control processor through the wireless interface, automatically reduces the volume of the audio entertainment from the first level to a second level in response to receiving the first automatic notification or the second automatic notification, receives the call termination message from the volume control processor through the wireless interface, and automatically returns the volume of the audio entertainment to the first level in response to receiving the call termination message.

8. The apparatus as in claim 7 wherein the wireless interface comprises WiFi.

9. The apparatus as in claim 7 wherein the second processor mutes the audio entertainment.

10. The apparatus as in claim 7 wherein the security threat comprises a fire.

11. The apparatus as in claim 7 wherein the security threat comprises an intruder.

12. The apparatus as in claim 7 wherein the first processor monitors a sensor located within the secured area for the security threat.

13. An apparatus comprising:

a security system that protects a secured area;

an audio device that provides audio entertainment within the secured area, wherein the audio device provides the audio entertainment at a volume having a first level;

a wireless interface between the security system and the audio device, wherein the audio device transmits a registration message to the security system through the wireless interface when the audio device is activated;

a first processor of the security system that detects a security threat within the secured area or detects a voice command from a second person proximate a user interface of the security system located within the secured area, receives a set-up instruction, and automatically provides a voice connection between the user interface and a remotely located central monitoring station in response to detecting the security threat, thereby facilitating a first person located at the remotely located central monitoring station conversing with the second person;

a volume control processor of the security system that operates in a standby mode, enters an active state in response to the first processor of the security system detecting the security threat or the voice command detects the set-up instruction, when in the active state, automatically transmits a volume reduction message to the audio device that transmitted the registration message in response to the first processor providing the voice connection or in response to the first processor detecting the voice command, and automatically transmits a call termination message to the audio device in response to the voice connection terminating; and a second processor of the audio device that receives the volume reduction message from the volume control processor through the wireless interface, automatically reduces the volume of the audio entertainment from the first level to a second level in response to receiving the volume reduction message, receives the call termination message from the volume control processor through the wireless interface, and automatically returns the volume of the audio entertainment to the first level in response to receiving the call termination message.

14. The apparatus as in claim 13 wherein the audio device comprises a plurality of audio devices.

15. The apparatus as in claim 13 wherein the user interface comprises the audio device.

* * * * *